July 2, 1929.  G. B. DUFFIELD  1,719,801
VALVE
Filed May 10, 1926
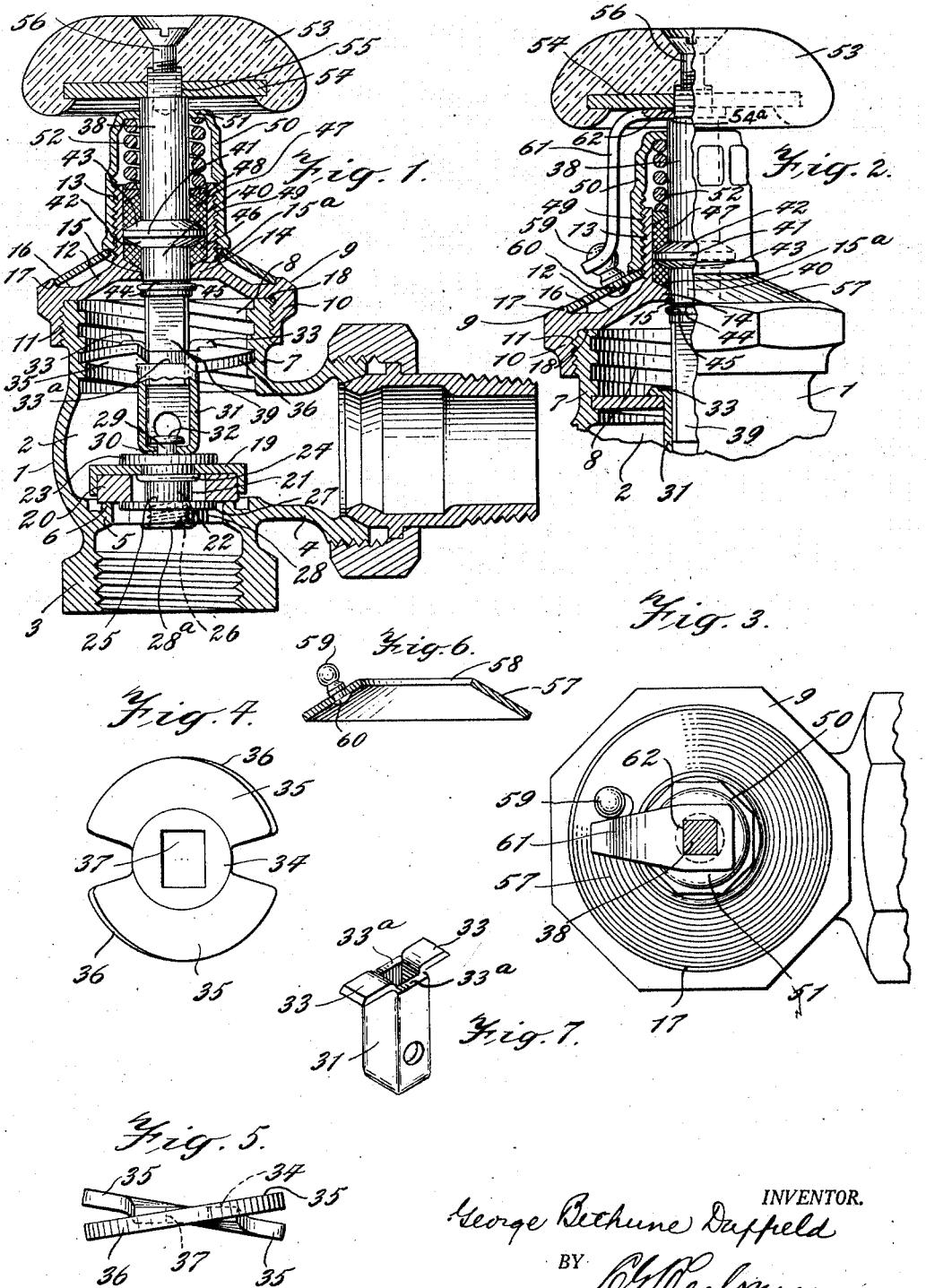
INVENTOR.
George Bethune Duffield
BY
his ATTORNEY.

Patented July 2, 1929.

1,719,801

UNITED STATES PATENT OFFICE.

GEORGE BETHUNE DUFFIELD, OF DETROIT, MICHIGAN, ASSIGNOR TO DETROIT LUBRICATOR COMPANY, OF DETROIT, MICHIGAN, A CORPORATION OF MICHIGAN.

VALVE.

Application filed May 10, 1926. Serial No. 107,849.

My invention relates broadly and generally to new and useful improvements in valves, and while it is capable of general application in various types of valves, it will be found particularly applicable and useful in hand-operated valves of the type used in heating systems for controlling the flow of the heating medium to radiators or other heating elements.

The invention consists in the novel construction of parts and the aggroupment thereof in operative combination, to be more fully described hereinafter, and the novelty of which will be particularly pointed out and distinctly claimed.

In the accompanying drawings to be taken as a part of these specifications, I have shown a preferred embodiment of my invention, and in which drawings—

Figure 1 is a vertical central sectional view illustrating my invention;

Fig. 2 is a detail sectional view showing a construction similar to Fig. 1, but with certain additional features;

Fig. 3 is a top plan view of the construction shown in Fig. 2;

Fig. 4 is a detail plan view of a thread member;

Fig. 5 is an edge view of the member shown in Fig. 4;

Fig. 6 is a transverse section through a plate forming one of the elements of my invention, and Fig. 7 is a perspective view of a valve-carrying or supporting member.

Referring to the drawings by characters of reference—

1 designates generally a valve body or casing, preferably made of suitable cast metal, and of any preferable design and size to suit it to the purposes for which it is intended. The body 1 is formed with a chamber 2, and at its bottom and side with nipples 3, 4, by means of which the valve may be connected in a pipe line or conduit, and which constitute the inlet to and outlet from the chamber 2. Within the chamber 2 and surrounding the passage through the nipple 3, is an annular ported wall 5 constituting a valve seat, which is preferably provided with a ridged or beaded seating face 6 with which a valve head or disk cooperates, as will be presently set forth, to regulate flow through the casing.

The body 1 is formed at its upper portion with a hollow neck or nipple extension 7, cylindrical in contour and located in axial alinement with the nipple 3 and valve seat 6, heretofore mentioned. The extension 7 is formed on its inner face with a coarse screw-thread 8 which is preferably a double thread, for a purpose to be hereafter described. The upper end of the extension 7 is closed by a suitable closure, preferably in the form of a cap or bonnet 9, provided with a depending peripheral flange 10, which is internally threaded, as at 11, on to said extension 7. The bonnet includes a transverse upper wall 12, and formed integral therewith is an external cylindrical tubular sleeve 13, open at its upper end, and at its base provided with an internal flange 14 surrounding a circular opening 15, said flange having an inwardly and downwardly inclined upper face $15^a$ constituting a packing seat, and said opening providing for passage of a valve-operating member or stem.

The upper surface of the bonnet is provided with an annular bearing face 16, which is surrounded by an annular raised bead or ledge 17, said face and bead being concentric with the opening 15 heretofore described. The bonnet when screwed into place preferably closely engages the upper edge of the extension 7, as at 18, so as to make a fluid-tight joint between the body and bonnet.

Within the chamber 2 and above the valve seat is arranged a disk valve comprising a flanged disk holder 19, in which is seated a valve disk in the form of a flat ring 20 of any suitable material. The disk holder is mounted on a carrier 21, including a body 22 projecting through a central opening in the holder 19, and having on its upper end a flange 23, against which the holder is clamped rigidly by a bead 24 on the body and swaged against the under face of the holder. The holder is provided with a shoulder 25 and a threaded extension 26 projecting through the valve disk, the latter being held in place by a washer 27 engaging said shoulder and clamped in place by a nut 28 threaded on said extension 26. After the nut 28 is in place, the end of the extension 26 is expanded or beaded over, as at $28^a$, to hold the nut against accidental displacement.

The carrier 21 is provided centrally on its upper face with an integral pin or shank member 29, which projects through an opening 30 in the transverse wall at the lower end of a sleeve 31 constituting a member for carrying said valve and for connecting the valve to an operating means or member. The end of the pin within the sleeve is beaded over, as at 32, so as to overlie the said lower wall of the sleeve and thereby serve to connect the valve to said sleeve. The diameter of the pin is less than that of the opening 30, so that the valve will have sufficient lateral play relative to the sleeve to adjust itself tightly to the seat 6.

The sleeve 31 is preferably drawn from sheet-metal, and is generally rectangular in cross-section, both internally and externally, and at the upper end of the sleeve two of the opposite walls thereof are provided with integral laterally struck lugs or stops 33. The other two opposite side walls of the sleeve terminate in shoulders 33ª which lie outside the side edges of the stops 33. Arranged on the sleeve 31 is a thread member of novel construction, consisting of a central portion or plate 34 of sheet-metal, having opposite spaced segmental wings 35 having arcuate outer edges 36. These wings 35 are deflected, flexed or twisted relative to the plane of plate 34, so that the said edges 36 constitute a thread or threads which mesh with the thread or threads 8 in the extension 7 of the valve body. It will be understood that these wings are flexed so as to take a fixed or set rigid position.

The thread-member is preferably secured in place on the sleeve 31 by forming said member with a central rectangular opening 37, which is passed over said sleeve before said lugs 33 are bent over, and so that the under face of said member 34 rests on said shoulders 33ª. The ears or lugs 33 are then bent outward on to the upper face of member 34, so that the latter is rigidly clamped between said lugs and said shoulders 33ª.

It will be seen that rotation of the sleeve and thread member, by virtue of the thread connection with the casing, will act to move the valve toward or away from the valve seat. The thread 8 is preferably of a steep or quick pitch, so as to move the valve the desired distance to and from its seat with a small number of rotations of said sleeve 31. The sleeve 31 and member 34 provide an extremely simple construction, which is not only highly efficient in operation, but may be produced at a minimum of labor and expense, inasmuch as they may be made of sheet-metal without machining operations of any kind. The arrangement also provides for expeditious and secure assembly without special securing devices.

Means for rotating the sleeve and thread-member in order to move the valve toward and from its seat, will now de described: Extending centrally through the sleeve 13 and the opening 15, is a valve-operating member, consisting of a cylindrical stem 38 having a lower end 39, which is rectangular in cross-section, and is sleeved within the sleeve so that said sleeve may slide thereon, and closely fitting the sleeve so that the latter will be turned thereby. The stem above the rectangular part 39 is provided with a cylindrical section 40, which is located in said opening 15 and extends above the flange 14 into and through the sleeve or flange 13, said cylindrical portion being of less diameter than the internal diameter of said sleeve 13. The stem is also provided with a circumferential lateral flange 41, having upper and lower cone surfaces 42, 43, said flange being located within sleeve 13 and spaced from the flange 14. The stem is rotatable, but is not movable lengthwise, and in order to prevent endwise movement upward or outward, the same is provided below the flange 14 with an annular groove 44 to receive a snap spring ring 45 which is of greater diameter than the opening 15 in said flange.

Beneath flange 41 and resting on the flange face 15ª, is a suitable packing washer 46 surrounding said stem, and above said flange 14 is a packing washer 47, over which is a metallic washer 48. Threaded, as at 49, on to the sleeve 13, and surrounding the stem, is a cap sleeve or nut 50, having at its upper end an inturned flange 51, between which and said washer 48 is a compression spring 52 which exerts its force expansibly to urge the washer 47, packing and stem toward the flange 14, thereby compressing and expanding the packing against said flange, the flange 41 and inner face of sleeve 13, to form a fluid-tight joint between the stem and bonnet.

The stem may be rotated by any suitable means, for example, a handle 53, having a reenforcing plate 54 having a central squared opening 55 to receive the squared upper end of the valve stem, the handle being secured in place by a screw 56 passed through the handle, plate 54 and threaded into the end of the stem.

I will now describe an efficient and novel element for application to the body, so as to serve as a finishing plate, a dial, or a stop-carrier for carrying a stop or limiting device for the operating member or stem. This element is preferably in the form of a frustro conical plate 57, preferably of metal, and having a central opening 58 to receive the sleeve 13, the diameter of said opening being such that the bounding edge or central portion of the plate around the opening is located beneath the lower edge of the cap 50. The conical plate is arranged with the apex or highest point beneath said cap, and the peripheral or lower edge portion rests on said surface 16 and closely adjacent the bead or ridge 17. The plate is made of a suitable material, rendering it radially flexible or resilient, so that when pressure is exerted on its central portion by screwing the cap 50 down, said plate will be moved or flexed radially into strong frictional engagement with said surface 16, and at the same time will be expanded or flexed outward so that the peripheral or outside edge will strongly engage the inner face of said bead. By this arrangement the plate will be positively clamped in position, and when so clamped acts as a positive stop for the downward movement of the cap piece which comes to a fixed stop and cannot be further screwed down once the disk is fastened in place. The construction will be of especial advantage when it is desired to employ a limiting stop for arresting rotation of the valve stem and thereby determining the opening position of the valve relative to its seat. In Figs. 2, 3 and 6 of the drawings, the plate 57 is provided with a stop fixed thereon, the same preferably consisting of a post 59 riveted through an opening in said plate, as at 60, and adapted to be engaged by the lower end of a stop arm 61 fixed to the stem, for example by forming said arm with a squared opening 62 tightly fitting the squared portion of the stem. The arm is clamped between the plate 54 and shoulder 54ª on the stem, thereby rigidly connecting the arm to the stem to rotate therewith. It will be seen that by screwing the cap-piece 50 back to release pressure thereof on the plate, the latter may be rotated to bring the stop post 59 at the desired position, whereupon by screwing the cap-piece down to clamp the plate in place, as described, the plate will be held rigidly against further rotation and the stop held fixed in adjusted position to limit rotation of the valve stem. It will be understood that the plate 57 has sufficient rigidity to prevent its being collapsed or deformed when clamped in place, but is sufficiently flexible or resilient radially, that pressure exerted on its central portion will expand it into engagement with the abutment 17 and that when the pressure is relieved will cause it to release from said abutment.

The construction and combination embodying the plate 57 affords a most convenient and efficient manner of providing a valve with a finishing plate, adding greatly to the pleasing appearance of the valve. It also provides an efficient construction whereby such a plate may be employed as a dial-plate or stop-plate for valves of the type known as "fractional valves", wherein it is desirable to provide a plate which will be rotatably adjustable relative to the valve stem so as to locate a stop or indication in a desired position relative to a pointer or stop member on the valve stem.

What I claim and desire to secure by Letters Patent of the United States is:—

1. In a structure of the character described, a valve body, a valve therein, an operating member for the valve, said body having an external stop spaced laterally from the operating member, a radially flexible element on the body and surrounding the operating member, and means for flexing said element into engagement with said stop.

2. In a structure of the character described, a valve body, a valve therein, an operating member for the valve, said body having an external annular abutment concentric with said operating member, a radially flexible element on the body and surrounding the operating member, and means for flexing said element into engagement with said abutment.

3. In a structure of the character described, a valve body, a valve therein, an operating member for the valve, said body having an external transverse bearing face and an annular abutment bounding said face and concentric with said operating member, a radially flexible element on the body and surrounding the operating member, and means for clamping said element against said face and flexing it radially into engagement with said abutment.

4. In a structure of the character described, a valve body, a valve therein, an operating member for the valve, said body having an external transverse bearing face and an annular abutment bounding said face and concentric with said operating member, a cone-shaped radially flexible element on the body and surrounding the operating member and having its circumferential edge portion on said face, and means for exerting pressure on the central portion of said element to flex the same into engagement with said abutment and clamp the same against said face.

5. In a structure of the character described, a valve body, a valve therein, an operating member for the valve, said body having an external transverse bearing face and an annular abutment bounding said face and concentric with said operating member, a cone-shaped radially flexible element on the body and surrounding the operating member and having its circumferential edge portion on said face, and means for exerting pressure on the central portion of said element to flex the same and move the periphery of said element into engagement with said abutment and clamp the same against said face.

6. In a structure of the character described, a valve body, a valve therein, a rotatable operating member for the valve, a radially flexible element on the body and surrounding the operating member, a stop on said element and a stop on the operating member cooperating with the stop on the element to limit rotation of said operating member, and means to flex said element into engagement with a part on said body whereby said element is held in position.

7. In a structure of the character described, a valve body, a valve therein, a rotatable operating member for the valve, a radially flexible element on the body and surrounding the operating member and rotatable about the same, a stop on said element and a stop on the operating member adapted to engage the stop on the element to limit rotation of said operating member, and means to flex said element into engagement with a part on said body whereby said element is held in position.

8. In a structure of the character described, a valve body, a valve therein, an operating member for the valve, a radially flexible element on the body and surrounding the operating member, and an element threaded on said body and operable on said element to flex the same into tight engagement with said valve body.

9. In a structure of the character described, a valve body, a valve therein, an operating member for the valve, a radially flexible element on the body and surrounding the operating member, and packing means for said operating member and including a clamping member adapted to flex said element into tight engagement with said valve body.

10. In a structure of the character described, a valve body, a valve therein, an operating member for the valve, a radially flexible element on the body and surrounding the operating member, and packing means for said operating member and including a clamping member threaded on the body and operable on said element to flex the same into tight engagement with said valve body.

11. In a structure of the character described, a valve body, a valve therein, an operating member for the valve, said body having an external transverse bearing face and an annular abutment bounding said face and concentric with said operating member, a cone-shaped flexible element on the body and surrounding the operating member, said element having its circumferential edge portion on said face, and packing means for said operating member, said packing means including a clamping member threaded on the body and operable on said element to flex the same into engagement with said abutment and to clamp the same against said face.

12. In a structure of the character described, a valve body, a valve therein, an operating member for the valve, a bonnet for said body, said bonnet having an external transverse bearing face and an annular abutment bounding said face and concentric with said operating member, a cone-shaped radially flexible element on the bonnet and surrounding the operating member, said element having its circumferential edge portion on said face, and means for exerting pressure on the central portion of said element to flex the same into engagement with said abutment and clamp the same against said face.

13. A valve of the character described comprising a casing having a port and an internal thread, a valve in the casing and cooperable with said port, a reciprocable and rotatable member carrying said valve, and a member fixed on said reciprocable and rotatable member to rotate therewith and consisting of a plate having its periphery deflected relative thereto to constitute a thread member engaging said internal thread, and means to rotate said members to move the valve relative to said port.

14. A valve of the character described comprising a casing having a port and an internal thread, a valve in the casing and cooperable with said port, a member connected to said valve to move the same relative to said port, said member comprising a plate having oppositely disposed segmental wings deflected relative to the plate to constitute thread members engaging said internal thread, and means to rotate said member to thereby move the valve relative to said port.

15. A valve of the character described comprising a casing having a port and an internal thread, a valve in the casing and cooperable with said port, a member connected to said valve to move the same relative to said port, said member comprising a plate having oppositely disposed segmental wings deflected relative to the plate to constitute thread members engaging said internal thread, and means having a sliding connection with said member for rotating the same.

16. A valve of the character described comprising a casing having a port and an internal thread, a valve in the casing and cooperable with said port, a member connected to said valve to move the same relative to said port, said member comprising a plate having oppositely disposed segmental wings deflected relative to the plate to constitute thread members engaging said internal thread, and an operating stem having a sliding connection with said member and operable to rotate said member to thereby move the valve relative to said port.

17. A valve of the character described comprising a casing having a port and an internal thread, a valve in the casing and cooperable with said port, a reciprocable and rotatable member carrying said valve, and a member fixed on said reciprocable and rotatable member to rotate therewith and consisting of a plate having segmental wings deflected relative to the plate to constitute thread-members engaging said internal thread, and means to rotate said members to move the valve relative to said port.

18. A valve of the character described comprising a casing having a port and an internal thread, a valve in the casing and cooperable with said port, a reciprocable and rotatable member carrying said valve, and a member fixed on said reciprocable and rotatable member to rotate therewith and consisting of a plate having oppositely disposed segmental wings deflected relative to the plate to constitute thread-members engaging said internal thread, and means to rotate said members to move the valve relative to said port.

19. A valve of the character described comprising a valve casing having a port and an internal thread, a valve in the casing and cooperable with said port, a reciprocable and rotatable sleeve member supporting said valve, a member fixed on said sleeve member and consisting of a plate having oppositely disposed segmental wings deflected relative to the plate to constitute thread-members engaging said internal thread, and means slidably engaging said sleeve member and operable to rotate the same and said thread-members to move the valve relative to said port.

20. A valve of the character described comprising a valve casing having a port and an internal thread, a valve in the casing and cooperable with said port, a reciprocable and rotatable sleeve member supporting said valve, a member fixed on said sleeve member and consisting of a plate having oppositely disposed segmental wings deflected relative to the plate to constitute thread-members engaging said internal thread, and an operating stem having a slidable connection with said sleeve member and operable to rotate said sleeve member and thread-members to thereby move the valve relative to said port.

21. A valve of the character described comprising a valve casing having a port and an internal thread, a valve in the casing and cooperable with said port, a reciprocable and rotatable sleeve member supporting said valve and having a shoulder and securing means, a member fixed on said sleeve member by said shoulder and securing means, said member consisting of a central plate having oppositely disposed segmental wings deflected relative to the plate to constitute thread-members engaging said internal thread, and means slidably engaging said sleeve member and operable to rotate the same and said thread-members to move the valve relative to said port.

22. A valve of the character described, comprising a casing having a port and a hollow extension, said extension having an internal thread coaxial with said port, an operating stem rotatably supported and projecting into said extension, a valve within the casing and cooperable with said port, a member fixed to said valve and carrying the same, a plate rigid with said member and having oppositely disposed segmental wings deflected relatively to the plate to constitute thread members cooperable with said internal thread, means depending from said stem and having operative connection with said member to rotate the same to move said valve to and from said port.

23. A valve of the character described, comprising a casing having a port and an openended hollow extension in axial alinement with said port, said extension having an internal thread, a bonnet closing said extension above said thread and having a sleeve on its upper side, packing in said sleeve, a rotatable stem fixed in said packing against longitudinal movement and projecting through said bonnet, resilient means to hold said packing in said sleeve, a thread member comprising a plate having oppositely disposed wings deflected relative to the plate, said wings having arcuate peripheries engaging said internal thread, a valve to cooperate with said port and supported by said thread member, and means depending from said stem within said casing to rotate said thread member whereby said valve may be moved to and from said port.

24. A valve of the character described, comprising a hollow casing having a port, a valve in said casing adapted to open and close said port, cooperable relatively movable threadedly-engaged members in said casing, one of said members comprising a hollow cylindrical member having an internal thread, the other of said members comprising a plate having oppositely disposed segmental wings deflected relative to the plate to constitute thread-engaging means, one of said members being fixed against reciprocation in said casing and the other of said members being fixed to said valve, means to rotate one of said members whereby relative rotation of said members will move said valve to or from its port.

In testimony whereof I have hereunto signed my name.

GEORGE BETHUNE DUFFIELD.